United States Patent
Helmreich et al.

(10) Patent No.: US 9,439,024 B2
(45) Date of Patent: Sep. 6, 2016

(54) CHIP CARD, END UNIT WITH CHIP CARD AND METHOD FOR MODIFYING A CHIP CARD

(71) Applicants: Frank Helmreich, Alpen (DE); Dierk Dohmann, Duesseldorf (DE)

(72) Inventors: Frank Helmreich, Alpen (DE); Dierk Dohmann, Duesseldorf (DE)

(73) Assignee: VODAFONE GMBH, Duesseldorf (DE)

(*) Notice: Subject to any disclaimer, the term of this patent is extended or adjusted under 35 U.S.C. 154(b) by 246 days.

(21) Appl. No.: 13/851,462

(22) Filed: Mar. 27, 2013

(65) Prior Publication Data
US 2013/0316765 A1 Nov. 28, 2013

(30) Foreign Application Priority Data
Mar. 27, 2012 (DE) .................. 10 2012 006 222

(51) Int. Cl.
*H04W 4/00* (2009.01)

(52) U.S. Cl.
CPC ............. *H04W 4/001* (2013.01); *H04W 4/003* (2013.01)

(58) Field of Classification Search
CPC ... H04W 4/001; H04W 4/003; H04W 8/245; H04W 24/10; H04M 1/72522; H04M 2250/14; H04L 67/14; H04L 67/04; H04L 65/1016; H04L 65/4084; H04L 9/3247; G06F 19/323; G01J 1/32
See application file for complete search history.

(56) References Cited

U.S. PATENT DOCUMENTS

| | | | |
|---|---|---|---|
| 2005/0037737 A1* | 2/2005 | Aubert | 455/411 |
| 2008/0070627 A1* | 3/2008 | Pua | 455/558 |
| 2008/0220744 A1* | 9/2008 | Rydgren et al. | 455/411 |
| 2008/0244710 A1* | 10/2008 | Foti | 726/4 |
| 2010/0282953 A1* | 11/2010 | Tam | 250/226 |
| 2011/0269423 A1 | 11/2011 | Schell et al. | |
| 2013/0185563 A1* | 7/2013 | Djabarov et al. | 713/176 |

FOREIGN PATENT DOCUMENTS

| | | | |
|---|---|---|---|
| DE | 101 28 948 A1 | | 1/2003 |
| DE | 102009015248 | * | 10/2009 |
| DE | 10 2009 015 248 A1 | | 10/2010 |
| WO | WO 2005041600 | * | 5/2005 |

OTHER PUBLICATIONS

Wikipedia, Mobile Network Code, 2011 https://web.archive.org/web/20110914175157/http://en.wikipedia.org/wiki/Mobile_Network_Code.*

* cited by examiner

*Primary Examiner* — Ping Hsieh
*Assistant Examiner* — James Yang
(74) *Attorney, Agent, or Firm* — Kriegsman & Kriegsman

(57) ABSTRACT

A chip card for use in a terminal device assigned to a communications network, having at least one data field containing variable parameter data. To modify parameter data stored on the chip card, the chip card has an application, which is implemented on the chip card, in addition to the at least one data field containing variable parameter data, that the application is designed for generating and/or providing variable parameter data, and that an interface is provided between the application and the at least one data field containing variable parameter data. In addition, a terminal device having such a chip card is described, the terminal device additionally having an input application for generating parameter data for the chip card and for providing the generated parameter data in the application for generating and/or providing variable parameter data.

10 Claims, 2 Drawing Sheets

CHIP CARD, END UNIT WITH CHIP CARD AND METHOD FOR MODIFYING A CHIP CARD

Figure 1:
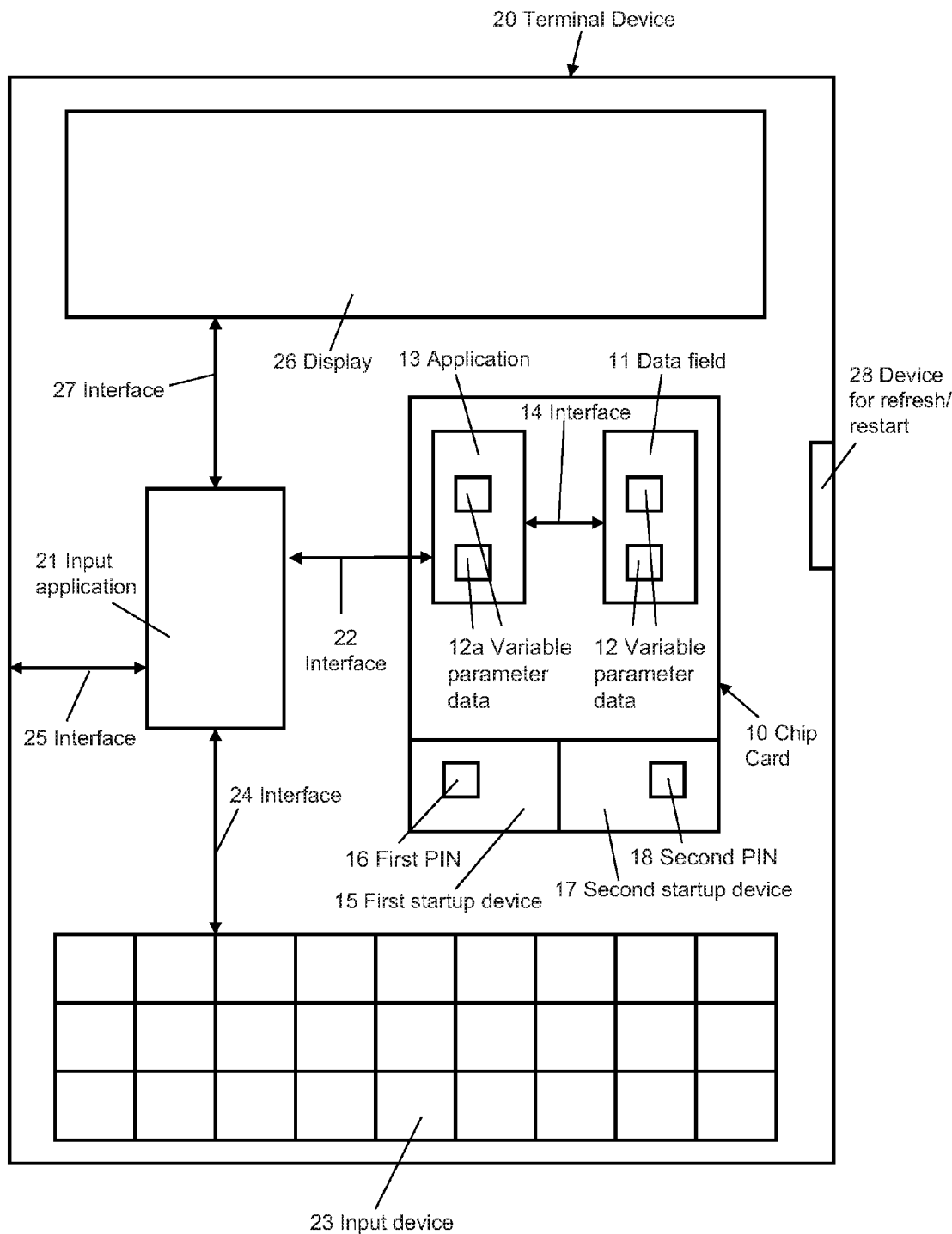

The present invention first relates to a chip card or a chip card application according to the preamble of patent claim 1. In addition, the invention relates to an end unit or terminal device for a communications network that has a chip card or a chip card application. Finally, the invention also relates to a method for modifying parameter data found on a chip card or a chip card application.

These chip cards or chip card applications are known in the prior art, for example, as SIM (Subscriber Identity Module) cards or SIM applications These types of SIM cards or SIM applications are designed for use in a terminal device, the terminal device being assigned to a communications network. As an example, the communications network may involve a mobile network. In this case, the terminal device could involve a mobile terminal device, such as a mobile phone.

At least one data field in which parameter data are found is provided on the SIM card or in the SIM application. These parameter data are necessary so that the user of a terminal device in which the SIM card or the SIM application is implemented can use his terminal device in the communications network.

It is often necessary to change the parameter data on the SIM card or in the SIM application, i.e., to modify them, for example, for test purposes or in the scope of simulations.

In the solutions known from the prior art, inputs to the SIM card or SIM application are written directly onto the SIM card or into the SIM application via a card reader. To do this, it is necessary to remove the SIM from the device. For this reason, the known solution is very time-consuming and thus disadvantageous.

An improvement would be to obtain a flexible line from the device to a SIM simulator. In this case, however, a rigid connection between a computer device and the terminal device is still always indicated. In the solution with a SIM simulator, it is additionally necessary to operate an actual SIM in parallel. This is necessary in order to implement security devices such as tampering protection, edge gradients of the electronic components, and the like. A simulation is technically time-consuming and in the case of the slightest deviation could break down the system. For example, the attack protection of the SIM could be triggered and the SIM could be disconnected. The solution worked out by this time-consuming technical method is very expensive, which is another negative aspect.

In another context, a solution for testing terminal devices is known from DE 10 2009 015 248 A1. For this purpose, a test program is generated by a test server on the network side and transmitted to the terminal device to be tested, where the test program is subsequently executed. The test program can be an applet, which is executed on the side of the SIM. The applet can be transmitted "over the air" to the terminal device, for example by SMS.

It is known from DE 101 28 948 A1 that a SIM can have a "SIM Application Toolkit (SAT)". Such a SAT is a type of execution program, which is implemented on the SIM, and it makes it possible for different actions to be initiated via the SIM. It is already known that the SAT can be changed from outside, e.g., "over the air".

With the known solutions, however, it is not possible to change parameter data that are found on the SIM and that particularly involve the basic data that are stored on the SIM.

The object of the present invention is thus to provide a solution with which the disadvantages described above can be circumvented. In particular, the solution shall make it possible in a simple and cost-effective manner that parameter data stored on a chip card or in a chip card application can be changed.

The object is achieved according to the invention by the chip card or the chip card application with the features according to the independent patent claim 1, the terminal device for a communications network with the features according to the independent patent claim 5, as well as the method for modifying parameter data found on a chip card or a chip card application with the features according to the independent patent claim 9. Additional features and details of the invention can be inferred from the subclaims, the description and the drawings. Features and details, which are described in connection with one aspect of the invention, are always applicable also to the full extent, of course, in connection with each of the other aspects of the invention, and vice versa, so that what is stated relative to one aspect of the invention always applies to the full extent as disclosed also in connection with the other aspects of the invention.

A basic concept of the present invention consists of the fact that now an application is provided on the chip card or in the chip card application that is designed for generating and/or providing modified parameter data. By means of this application, in particular, settings on the chip card or the chip card application can be changed directly in the chip card or in the chip card application, in particular without a card reader and/or flexible line connection, and thus directly on a terminal device in which the chip card or the chip card application is implemented. In this way, it is particularly possible, without special technical expenditure, to change the functions and settings of the chip card or the chip card application in the live network and open field.

According to the first aspect of the invention, a chip card or a chip card application, in particular a SIM or a SIM application or a USIM or a USIM application, is provided for use in a terminal device that is assigned to a communications network. The chip card or the chip card application has at least one data field containing modifiable or variable parameter data and is characterized according to the invention in that the chip card or the chip card application has an application, in particular an application software that is implemented on the chip card or in the chip card application, in addition to the at least one data field containing variable parameter data, in that the application is designed for generating and/or providing variable parameter data, and in that an interface is provided between the application and the at least one data field containing variable parameter data.

A chip card or a chip card application is provided according to the first aspect of the invention. A chip card particularly involves a card that is introduced into a terminal device, for example it is plugged in or inserted. The chip card particularly serves for the identification of a user in a communications network. Connections to the network, for example telephone connections and/or data connections, are made available to the subscriber from a network operator by means of such a chip card. In particular, the terminal device assigned to a subscriber is assigned via the chip card to a communications network and is authenticated in this network. A chip card application involves the same mode of operation. Of course, this mode of operation is no longer accommodated on a card separate from the terminal device. Rather, this mode of operation implemented in a fixed manner in the terminal device for example, via a circuit-design and/or software-based configuration. The present invention is not limited to specific types of chip cards or chip card applications. For example, a configuration in the form of a SIM or a SIM application (SIM=Subscriber Identity Module) or a USIM or a USIM application (USIM=Universal Subscriber Identity Module) can be provided.

The chip card or the chip card application is designed for use in a terminal device that is assigned to a communications network. The communications network may preferably involve a telecommunications network, in particular a mobile network, the invention not being limited to specific kinds or types of communications networks. The terminal device is designed corresponding to the configuration of the communications network. Thus, the terminal device can be designed in any described manner. It is only important that it can be utilized as intended in the communications network to which it is assigned. For example, in a mobile network, the terminal device can be designed in the form of a mobile phone. In the further course of the description, the present invention will be described for clarification on the basis of the more familiar mobile phone assigned to a mobile network, without the invention being limited to this concrete configuration.

The chip card or the chip card application according to the invention has at least one data field containing variable parameter data. A data field is particularly the smallest independent unit of a data set. A data field is particularly characterized by the field names, the type of data, for example numerical or alphanumerical, the length of the field, for example in characters or bytes, as well as the field content. The parameter data particularly involves data relative to the identification and/or authentification of a user and/or the terminal device in a communications network.

According to the invention, the chip card or the chip card application now has an application, in particular an application software, which is implemented on the chip card or in the chip card application, in addition to the at least one data field containing variable parameter data. The application is particularly a type of application software. The application is implemented on the chip card or in the chip card application, in addition to the at least one data field containing the parameter data. It is preferably non-modifiable. It is possible, however, to modify the settings on the chip card or in the chip card application via the application. How this can be done in individual cases will be described in greater detail below. Thus, the application represents an essential difference from the "SIM application toolkit (SAT)" already known in the prior art. The SAT itself in fact can also be found on the chip card. Of course, it is only possible to modify the SAT itself. The SAT is not able to change settings that are present on the chip card or in the chip card application, that is, the corresponding parameter data.

For example, data fields that must be freed up—so that the contents of the data fields can be changed—are present on the chip card or in the chip card application The application provided according to the invention recognizes these data fields, in which modified parameter data can be written and also performs this writing.

The present invention is not limited to a specific number of data fields, a specific number of parameter data or specific types of parameter data. In particular, existing entries in specific data fields can be modified, or entries can be made possible additionally on the chip card or in the chip card application via the application that is implemented in addition to the data fields containing parameter data.

The application is designed for generating and/or providing variable parameter data. On the one hand, it is possible that the variable parameter data are generated in the application itself. For example, it may be provided for this purpose that the parameter data for modifying are entered into the application and that the application subsequently transfers the data to the corresponding data field and enters the data in this field. It is also possible, however, that the variable parameter data are generated completely or partially in another place, that the generated parameter data are transferred to the application, for example, via a suitable interface, that the modified parameter data are then assigned to the corresponding data fields in the application, and that the parameter data are optionally modified, worked up or processed once more. In the last-named case, the application particularly serves for the purpose of providing the modified parameter data in a required manner.

Finally, an interface is provided between the application and the at least one data field containing variable parameter data. The modified parameter data can be transferred via this interface from the application to the corresponding at least one data field. For example, the parameter data from the application can be written into the data field, or parameter data that are present in the data field can be overwritten by the modified parameter data via the interface.

In addition, a chip card or a chip card application is preferred, in particular a SIM or a SIM application or a USIM card or a USIM application, for use in a terminal device that is assigned to a communications network, in particular a chip card or a chip card application as described above, having a first startup device for conducting a first startup procedure for the subsequent operation of the chip card or the chip card application in an operating mode, as well as, in addition, having a second startup device for conducting a second startup procedure for conducting a de-blocking procedure of the chip card or the chip card application. This involves one possibility, since a chip card or a chip card application, which has been blocked in an undesired manner for the modification of the parameter data, can be again de-blocked. For this purpose, a second startup procedure is provided for the startup.

It is preferably provided that a first PIN (personal identification number) is assigned to the first startup device and that a second PIN is assigned to the second startup device. The first PIN may involve, for example, the working PIN conceived for normal operation. The second PIN may involve a special de-blocking PIN.

If the chip card or the chip card application, or a terminal device on which the chip card or the chip card application is implemented, is blocked, and the second PIN, the de-blocking PIN, is input, the terminal device is re-booted. Preferably, the terminal device is not registered in the communications network, however. Rather, it can be transmitted to the terminal device that it is connected to a simulator. It is thereby made possible to again establish the blocked settings, i.e., to reset. It is then possible to repeatedly access tools, so that other changes can be made in the parameter data; thus the terminal device can be started up again and operated in the normal operating mode. If this is done, the terminal device, for example, can again be activated via the first PIN.

If the communications network involves a mobile network, the second startup device can be designed preferably for conducting a de-blocking procedure of the chip card or the chip card application, in which the MCC value is set to 001 and the MNC value is set to 01. The MCC value involves the "Mobile Country Code" consisting of three numbers. The MNC value involves the "Mobile Network Code" consisting of two numbers. The Mobile Country Code is an established country identification that is used together with the Mobile Network Code for identifying a mobile network.

According to another aspect of the invention, a terminal device is provided for a communications network, in particular for a mobile network, which has a chip card or a chip card application according to the invention, as described above. With respect to the features and details as well as the mode of operation of the terminal device, the above statements for the chip card or the chip card application are thus also referred to in the full extent relative to the disclosure.

In addition, the terminal device has an input application for generating parameter data for the chip card or the chip card application and for providing the generated parameter data in the application for generating and/or providing variable parameter data. The input application particularly serves for the purpose of enabling inputs to be made into the corresponding data fields of the chip card or the chip card application.

It is preferably provided that the application for generating and/or providing variable parameter data that is implemented on the chip card or in the chip card application is a component of the input application. It can also be provided, in particular, that the input application involves this application for generating and/or providing variable parameter data that is implemented on the chip card or in the chip card application. It can be provided in another configuration that the input application has an interface to the application for generating and/or providing variable parameter data. In this case, the input application acts jointly with the application. The input application is particularly implemented on/in the terminal device.

In another configuration, it is provided that the input application has an interface to an input device provided in the terminal device, and/or that the input application has an interface to an input device that is spatially separate from the terminal device. In the first-named case, the input device is found in the terminal device. This means that the modification of the parameter data can be undertaken in the terminal device itself or by means of the terminal device itself. In the last-named case, the input can be made at a distance to the terminal device, i.e., remotely. The parameter data for modifying, for example the corresponding values, are entered via the input device, for example in the input application or directly in the application onto the chip card or the chip card application. The input device may involve, for example, an operating panel, e.g., a keyboard, a keypad, or the like. In the case of a mobile phone, the input device involves, for example, the keypad of the mobile phone.

In another configuration, the terminal device has a refresh and/or restart device for the terminal device. A refresh is particularly understood to be a process in which or by means of which information is renewed. By means of this device, the terminal device can be refreshed or restarted, for example by a pushbutton, in particular to activate the corresponding new entries.

If the terminal device should now have an error function or is no longer operable, it can be started via the second startup possibility already described further above, and the settings of the application on the chip card or the chip card application can be bypassed. This can preferably be conducted via a second startup procedure with the settings of the MCC and the MNC of 001 & 01. The terminal device now thinks it is connected to a simulator and starts up completely normally.

According to another aspect of the invention, a method is provided for modifying parameter data found on a chip card or in a chip card application, wherein the parameter data are stored in at least one data field of the chip card or of the chip card application, wherein the chip card or the chip card application has an application, in particular an application software, which is implemented on the chip card or in the chip card application, in addition to the at least one data field containing variable parameter data. The method is characterized by the following steps according to the invention:

Variable parameter data for modifying are generated in the application, and/or variable parameter data for modifying are provided from the application; By means of an interface, the modified parameter values generated in the application and/or the modified parameter values generated from the application are written into the at least one data field containing variable parameter data of the chip card or the chip card application and are stored therein.

It is particularly provided that the method is conducted in a chip card or a chip card application according to the invention as described further above, or in a terminal device according to the invention as described further above. With respect to the features and details as well as the mode of operation of the method according to the invention, the above statements for the chip card or the chip card application according to the invention and for the terminal device according to the invention are thus also referred to in the full extent relative to the disclosure.

The method is preferably designed for testing a chip card or a chip card application or for conducting simulations of the chip card or the chip card application.

If the chip card or the chip card application is implemented in a terminal device for a communications network, in particular for a mobile network, and the terminal device has an input application for generating parameter data for the chip card or the chip card application and for providing the generated parameter data in the application for generating and/or providing variable parameter data, the method is preferably characterized in that the parameter data for modifying are generate via an input device that is provided in the terminal device and that is connected to the input application via an interface, and/or in that the parameter data for modifying are generated via an input device spatially separate from the terminal device and are transferred to the input application implemented in the terminal device via an interface.

It is preferably provided in turn that the application for generating and/or providing variable parameter data that is implemented on the chip card or in the chip card application is a component of the input application. It can also be provided, in particular, that the input application involves this application for generating and/or providing variable parameter data that is implemented on the chip card or in the chip card application. It can be provided in another configuration that the input application has an interface to the application for generating and/or providing variable parameter data. In this case, the input application acts jointly with the application. The input application is particularly implemented on/in the terminal device.

It can be preferably provided in another configuration that, after the generated modified parameter values have been written into the at least one data field containing variable parameter data of the chip card or the chip card application, a refresh procedure or a restart procedure of the chip card or the chip card application or of a terminal device in which the chip card or the chip card application is implemented is conducted.

If the chip card or the chip card application has a first startup device for conducting a first startup procedure for subsequent operation in an operating mode, in particular with the input of a first PIN, and has a second startup device for conducting a second startup procedure for conducting a de-blocking procedure of the chip card or chip card application, in particular with the input of a second PIN, it is preferably provided that, if a blocking of the chip card or the chip card application or of a terminal device in which the chip card or the chip card application is implemented occurs during or after conducting the refresh procedure or the restart procedure, the second startup procedure is conducted and a de-blocking of the chip card or the chip card application or of a terminal device in which the chip card or the chip card application is implemented is brought about.

In conducting the de-blocking procedure during a second startup procedure, the MCC value found in the chip card or the chip card application is preferably set to 001 and the MNC value is preferably set to 01.

An example for the basic execution of the method will now be described based on the SIM lock. It is therefore provided that the communications network involves a mobile network and the terminal device is a terminal device assigned to the mobile network, for example, a mobile phone. For example, the IMSI (International Mobile Subscriber Identity) must be set in this case. In order to change the settings of the IMSI, entries must be changed in a SIM data field. For this purpose, the necessary data must be input by way of an input matrix via an input device, for example, the input device of the terminal device, in the case of the input application or the application implemented on the SIM card. Different input regions on the application can be covered by different matrix structures. If the terminal device is blocked, for example by a SIM lock, it can only be turned off; otherwise it is completely without function. However, a de-blocking is now possible via the second startup procedure.

The present invention in particular relates to a chip card for use in a terminal device that is assigned to a communications network, having at least one data field containing variable parameter data. In order to be able to modify parameter data stored on the chip card, it is provided that the chip card has an application that is implemented on the chip card, in addition to the at least one data field containing variable parameter data, that the application is designed for generating and/or providing variable parameter data, and that an interface is provided between the application and the at least one data field containing variable parameter data. In addition, a terminal device having such a chip card is described, wherein the terminal device additionally has an input application for generating parameter data for the chip card and for providing the generated parameter data in the application for generating and/or providing variable parameter data. Further, a method is described for modifying parameter data found on a chip card or in a chip card application.

Figure 2:
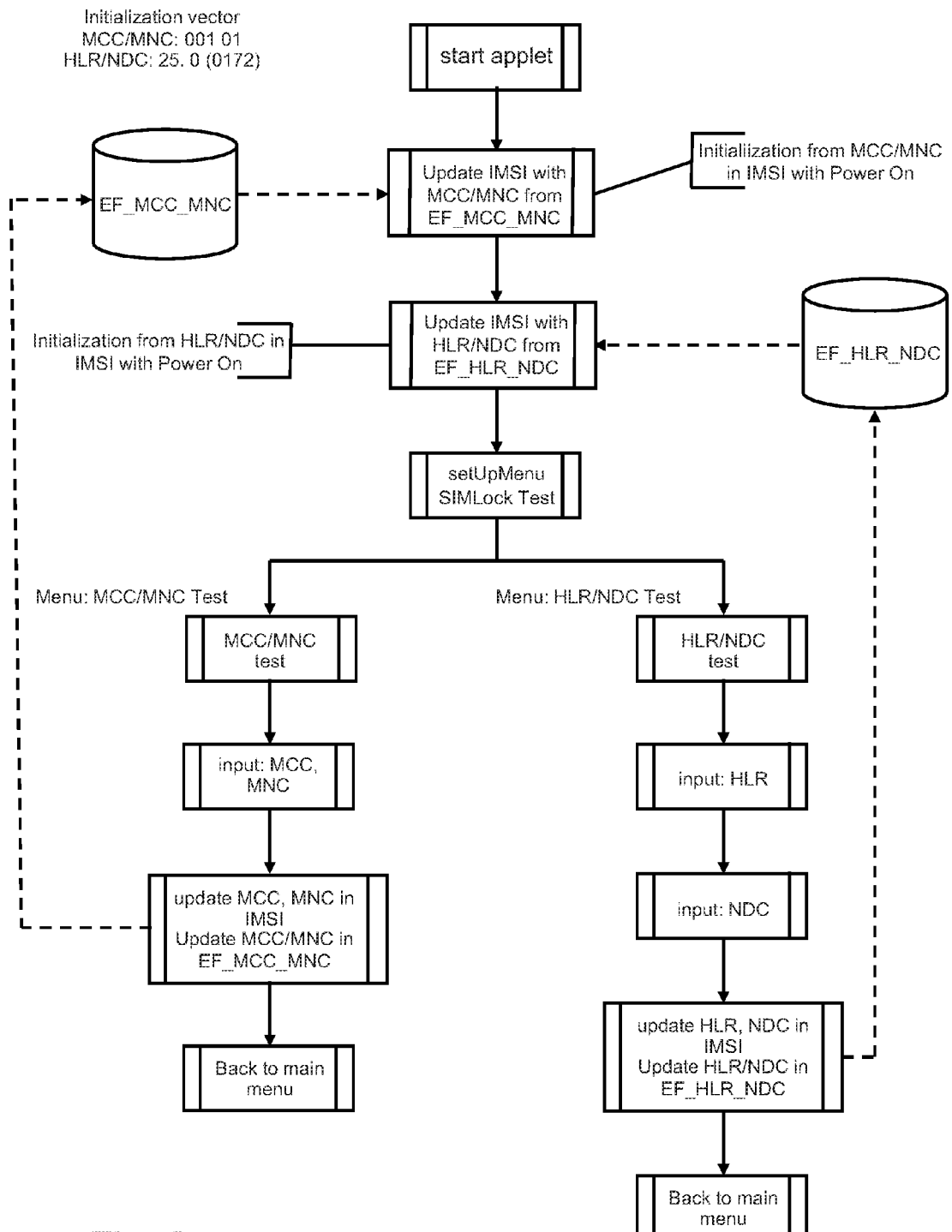

The invention will now be explained in more detail on the basis of embodiment examples with reference to the appended drawings. Herein:

FIG. 1 shows, in schematic representation, a terminal device on which the method according to the invention is executed; and FIG. 2 shows the execution example of a setting of an IMSI for a SIM lock.

A terminal device 20 that is assigned to a communications network assigned as mobile network, is shown in FIG. 1. The terminal device 20 is designed in particular as a mobile phone. In conventional manner, the terminal device 20 provides an input device 23 in the form of a keyboard and a display device 26 in the form of a display. In addition, a chip card 10 in the form of a SIM card is inserted in the terminal device 20.

At least one data field 11 in which variable parameter data 12 are stored is found on the chip card 10. The parameter data particularly involve data relative to the identification and/or authentication of a user and/or of the terminal device 20 in the communications network. An application 13 in the form of an application software is additionally implemented on the chip card 10, by means of which the parameter data 12 can be changed in the at least one data field 11 on the chip card 10.

In order to be able to do this, terminal device 20 provides an input application 21. For example, the input application 21 and the application 13 of the chip card 10 can be identical. It is also conceivable, however, that the input application is a fixed component, for example a software-based component of the terminal device 20, whereas the application 13 is a component of the chip card 10. In this case, an interface 22 is provided for exchanging data between the input application 21 and the application 13.

Now, if parameter data 12 in the data field 11 on the chip card 10 are to be changed, the input application 21 and the application 13 are activated on the chip card 10. The values for the parameter data to be changed are generated via the input device 23 and are transferred to the input application 21 via an interface 24. The parameter data that have been input and are to be changed can also be shown on the display device 26 of the terminal device 20 via another interface 27. Alternatively or additionally, the terminal device 20 may have an interface 25 to a remotely lying input device (not shown), so that the input can also be provided via such a remotely lying input device.

The parameter data that have been input and are to be changed are transferred to the chip card via the interface 22 from the input application 21 to the application 13, and are provided on the chip card as parameter data 12a to be changed.

Finally, an interface 14 is provided between the application 13 and the at least one data field 11 containing variable parameter data 12. The modified parameter data 12a can be transferred via this interface 14 from the application 13 to the corresponding at least one data field 11. For example, the parameter data 12a from the application 13 can be written into the data field 11, or parameter data 12 that are present in the data field 11 can be overwritten by the modified parameter data 12a via this interface 14.

After the modification of the parameter data has been concluded, the terminal device 20 is refreshed or restarted via a device 28 for refreshing and/or restarting, for example a pushbutton, in particular in order to activate the corresponding new entries.

If the terminal device 20 should now have an error function or is no longer operable, it can be restarted by means of a second startup possibility. For this purpose, the chip card 10 has a first startup device 15 for conducting a first startup procedure for the subsequent operation of the chip card 10 in an operating mode, as well as a second startup device 17 for conducting a second startup procedure for conducting a de-blocking procedure of the chip card 10. For example, a first PIN 16 is assigned to the first startup device 15, whereas a second PIN 18 is assigned to the second startup device 17.

If the chip card 10, or the terminal device 20 is blocked and the second PIN 18, the de-blocking PIN, is input, the terminal device 20 is re-booted. In this case, the terminal device 20 is not registered in the communications network, however. Rather, it is transmitted to the terminal device 20 that it is connected to a simulator. It is thereby made possible for the blocked settings to be reset. It is then possible to again access the tools, so that other changes can be made in the parameter data; thus the terminal device 20 can again be started up and operated in the normal operating mode. If this is performed, the terminal device 20, for example, can again be activated via the first PIN 16. Preferably, for conducting the de-blocking procedure of the chip card 10 or of the terminal device 20, the MCC value is set to 001 and the MNC value is set to 01.

An example of the basic execution of the method will now be described on the example of the SIM lock with reference to FIG. 2. For this purpose, the IMSI for the SIM lock must be set. In the execution diagram shown in FIG. 2, the meanings are as follows: MCC—Mobile Country Code, MNC—Mobile National Code, HLR—Home location REGISTERED MAIL, NDC—National Dialing Code. In order to change the settings of the IMSI, entries must be changed in the SIM data field 6F07. For this purpose, the necessary data must then be input for application 13 by means of an input matrix. Different input regions in the application 13 can be covered by different matrix structures. If the device* is blocked, for example based on a SIM lock, it can only be turned off; otherwise it is completely without function. A de-blocking is now possible, however, as described above, via the second startup procedure.

*sic; terminal device?—Translator's note.

LIST OF REFERENCE CHARACTERS

10 Chip card
11 Data field
12 Variable parameter data
12*a* Variable parameter data
13 Application
14 Interface
15 First startup device
16 First PIN
17 Second startup device
18 Second PIN
20 Terminal device
21 Input application
22 Interface
23 Input device
24 Interface for the input device
25 Interface to an input device spatially separate from the terminal device
26 Display device (display)
27 Interface between input application and display device
28 Device for refresh/restart of the terminal device

The invention claimed is:

1. A chip card or a chip card application, in particular a SIM or a SIM application or a USIM or a USIM application, for use in a terminal device that is assigned to a communications network, having at least one data field containing variable parameter data, said parameter data involving data relative to at least one of identification and authentication of at least one of a user and the terminal device in the communications network, is hereby characterized in that the chip card or the chip card application has an application, in particular an application software, which is implemented on the chip card or in the chip card application, in addition to the at least one data field containing variable parameter data, wherein by means of said application the parameter data can be changed in the at least one data field, in that the application is designed for at least one of generating and providing variable parameter data, that an interface is provided between the application and the at least one data field containing variable parameter data, wherein by means of said interface the parameter data from the application can be written into the data field or parameter data that are present in the data field can be overwritten by the modified parameter data via the interface, and that the chip card or the chip card application has a first startup device for conducting a first startup procedure for subsequent operation of the chip card or the chip card application in an operating mode, and in addition, a second startup device for conducting a second startup procedure for conducting a de-blocking procedure of the chip card or the chip card application, in which the MCC value is set to 001 and the MNC value to 01.

2. The chip card or the chip card application according to claim 1, further characterized in that a first PIN is assigned to the first startup device and that a second PIN is assigned to the second startup device.

3. A terminal device for a communications network, in particular for a mobile network, having a chip card or a chip card application according to claim 1, in addition, having an input application for generating parameter data for the chip card or the chip card application and for providing the generated parameter data in the application for at least one of generating and providing variable parameter data.

4. The terminal device according to claim 3, further characterized in that the application for at least one of generating and providing variable parameter data is a component of the input application, or that the input application has an interface to the application for at least one of generating and providing variable parameter data.

5. The terminal device according to claim 3, further characterized in that the input application has at least one of an interface to an input device provided in the terminal device and an interface to an input device spatially separate from the terminal device.

6. The terminal device according to claim 3, further characterized in that it has a device for at least one of refreshing and restarting the terminal device.

7. A method for modifying parameter data found on a chip card or a chip card application, the parameter data being stored in at least one data field of the chip card or of the chip card application, the parameter data involving data relative to at least one of identification and authentication of at least one of a user and a terminal device in a communications network, the chip card or the chip card application having an application, in particular an application software, wherein by means of said application the parameter data can be changed in the at least one data field, said application being implemented on the chip card or in the chip card application, in addition to the at least one data field containing variable parameter data, is hereby characterized by the following steps:

at least one of variable parameter data for modifying are generated in the application and variable parameter data for modifying are provided from the application;

by means of an interface, at least one of the modified parameter values generated in the application and the modified parameter values provided from the application are written into the at least one data field containing variable parameter data of the chip card or the chip card application and are stored therein, or parameter data that are present in the data field can be overwritten by the modified parameter data via the interface.

8. The method according to claim 7, further characterized in that the method is conducted for a chip card or a chip card application wherein the chip card or chip card application is, in particular a SIM or a SIM application or a USIM or a USIM application, for use in a terminal device that is assigned to a communications network, having at least one data field containing variable parameter data, said parameter data involving data relative to at least one of identification and authentication of at least one of a user and the terminal device in the communications network, and wherein the chip card or the chip card application has an application, in particular an application software, which is implemented on the chip card or in the chip card application, in addition to the at least one data field containing variable parameter data, wherein by means of said application the parameter data can be changed in the at least one data field, in that the application is designed for at least one of generating and providing variable parameter data, and that an interface is provided between the application and the at least one data field containing variable parameter data, wherein by means of said interface the parameter data from the application can be written into the data field or parameter data that are present in the data field can be overwritten by the modified parameter data via the interface, or in that the method is conducted for a terminal device for a communications network, in particular for a mobile network, having said chip card or said chip card application and, in addition, having an input application for generating parameter data for the chip card or the chip card application and for providing the generated parameter data in the application for at least one of generating and providing variable parameter data.

9. The method according to claim 7, further characterized in that it is designed for testing a chip card or a chip card application or for conducting simulations of the chip card or the chip card application.

10. The method according to claim 7, the chip card or the chip card application being implemented in a terminal device for a communications network, in particular for a mobile network, and the terminal device having an input application for at least one of generating parameter data for the chip card or the chip card application and for providing the generated parameter data in the application for at least one of generating and providing variable parameter data, further characterized in that at least one of the parameter data for modifying are generated via an input device that is provided in the terminal device and that is connected to the input application via an interface, and in that the parameter data for modifying are generated via an input device spatially separate from the terminal device and are transferred to the input application implemented in the terminal device via an interface.

* * * * *